United States Patent

Colley

[11] 3,976,341
[45] Aug. 24, 1976

[54] SEAL
[75] Inventor: Larry Leroy Colley, Dayton, Ohio
[73] Assignee: Chrysler Corporation, Highland Park, Mich.
[22] Filed: July 21, 1975
[21] Appl. No.: 587,578

[52] U.S. Cl. .............................................. 308/187.1
[51] Int. Cl.² ......................................... F16C 33/78
[58] Field of Search ................. 308/187.1, 187, 36.1

[56] References Cited
UNITED STATES PATENTS 3,770,991  11/1973  Lajin ................................ 308/187.1
3,869,131  3/1975   Derner .............................. 308/187.1

Primary Examiner—M. H. Wood, Jr.
Assistant Examiner—Richard A. Bertsch
Attorney, Agent, or Firm—Talburtt & Baldwin

[57] ABSTRACT

Seal having an annular-shaped carbon ring, a bellows adjacent the carbon ring and a retainer surrounding both. A spring drivingly connects the retainer with another larger retainer which surrounds the seal.

10 Claims, 4 Drawing Figures

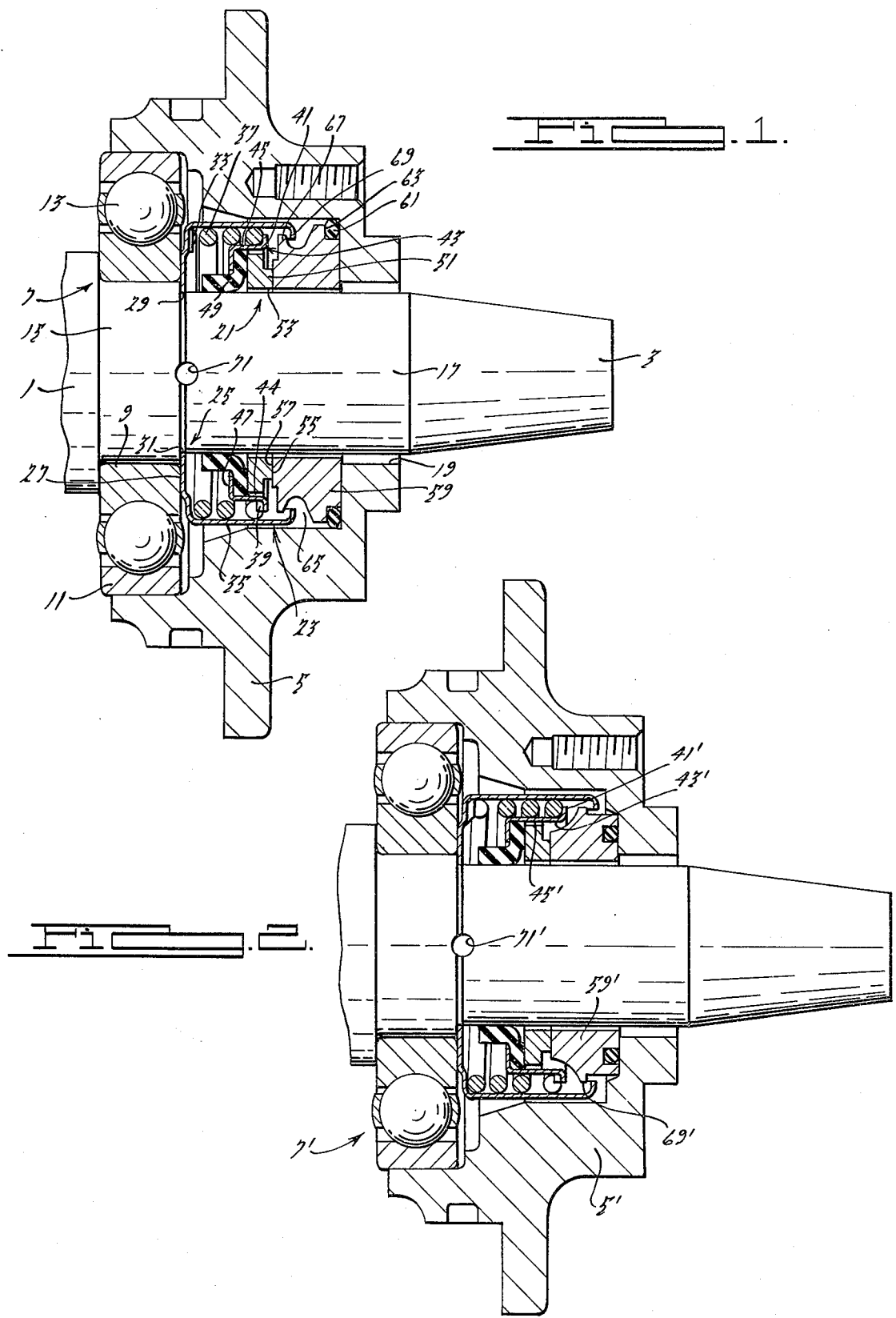

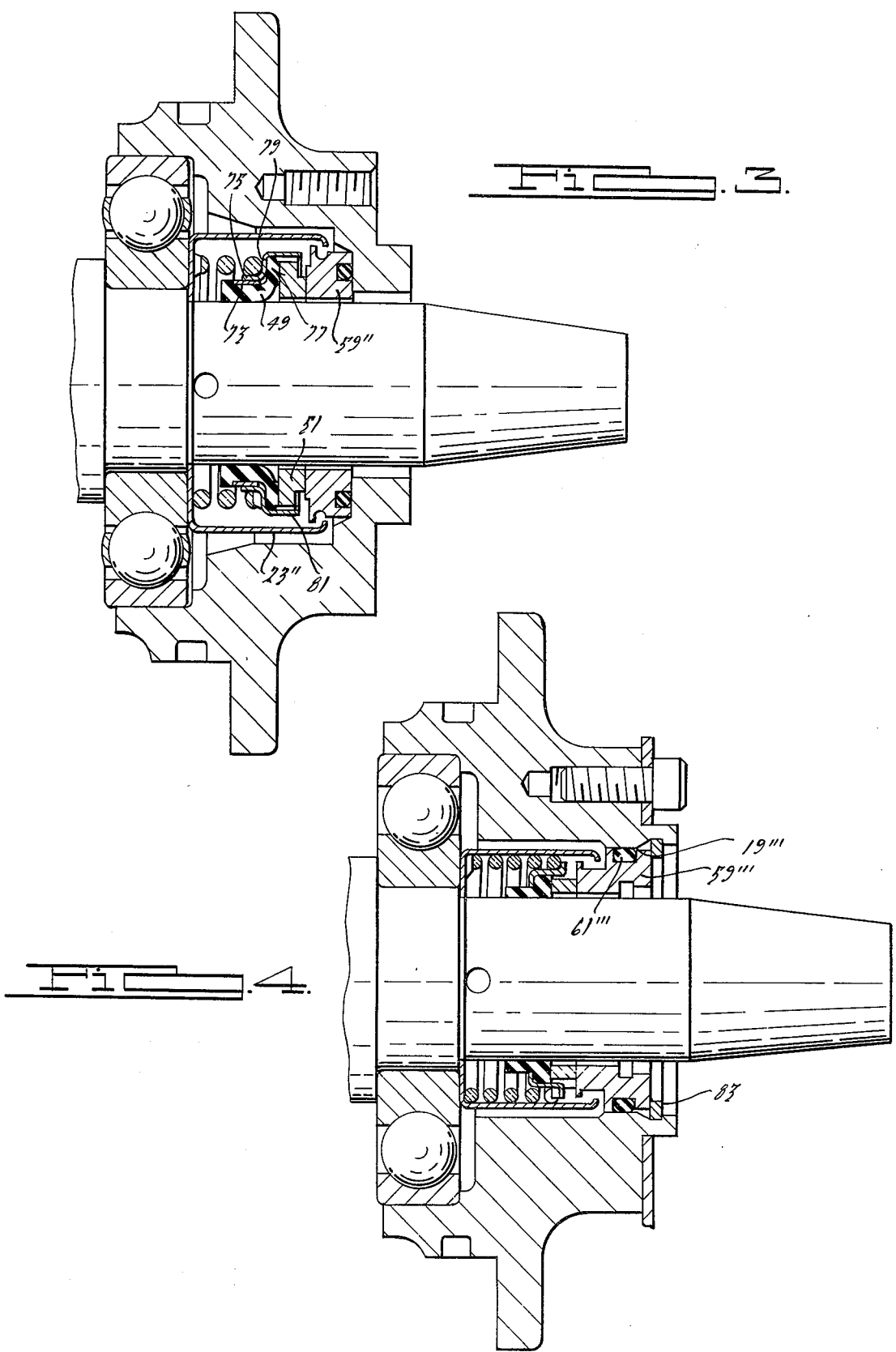

SEAL

BACKGROUND OF THE INVENTION

This invention relates to seals, and more particularly, to an oil seal for the shaft of an air conditioning compressor of the type used in automotive air conditioning systems.

Air conditioning compressors of the type used in automotive air conditioning systems, include a shaft which extends from one end of the compressor and on which is mounted a magnetic clutch. The shaft is mounted in the end face of the compressor housing by bearings and a seal is incorporated around the shaft and within the housing in wall to prevent the leakage of oil from the compressor housing. These seals are subjected to high temperatures during operation of the compressor and also are subject to a considerable amount of contamination from the elements. It is imperative that these seals be lubricated to prevent over-heating inasmuch as the seals must contact both non-rotating parts and the rotating shaft. This invention is directed to an improved type of seal.

BRIEF SUMMARY OF THE INVENTION

Briefly, this invention includes a seal comprising an annular shaped carbon member, a bellows adjacent said carbon member, a retainer surrounding said bellows and carbon, a spring engageable with the carbon retainer, and a seal retainer surrounding the spring, seal retainer having means for retaining a portion of lubricating oil adjacent various components of the seal for removing the heat from the latter.

One of the primary objects of this invention is to provide a seal of the type utilized in an automotive air conditioning compressor assembly which permits the reduction of temperatures in the area around the seal.

Another object of this invention is the provision of a seal of the type described which inhibits contamination of the seal face.

A further object of this invention is to provide a seal such as described which provides a means for circulating cooling oil over various components of the seal subjected to heat.

Another object of this invention is to provide a seal of the class described which is simple and economical in construction and efficient in operation.

Other objects and advantages of this invention will be made apparent as the description progresses.

BRIEF DESCRIPTION OF THE DRAWINGS

In the accompanying drawings which several of various possible embodiments are shown, FIG. 1 is a vertical section through the housing of a compressor having one embodiment of this invention installed therein; and FIGS. 2, 3 and 4 are sections similar to FIG. 1 illustrating the second, third and fourth embodiments, respectively, of the seal of this invention incorporated therein.

Like numerals represent corresponding reference parts throughout the several used views of the drawings.

DESCRIPTION OF THE PREFERRED EMBODIMENT

Referring now to the drawings, an air conditioning compressor shaft is generally indicated in FIG. 1. The shaft includes a stub portion 3, on which a (hub, not shown) of a magnetic clutch (also not shown) may be mounted. The stub portion 3 is rotatably mounted in a housing inflate 5 by a bearing 7. More specifically, bearing 7 includes an inner race 9 secured to the shaft and outer race 11 secured to the housing input 5 and the plurality of bearings 13 caged between the inner and outer races 9 and 11. The inner race is mounted on an enlarged shoulder portion 15 of stub 3 extending outwardly from shoulder 15 as an elongated cylindrical portion 17. This extends through an opening 19 in the end plate 5.

The seal of this invention is indicated generally at 21. It includes a cup-shaped retainer 23 having an opening 25 in the bottom portion 27 thereof. Opening 25 has two flats as indicated at 29 and 31 fitting over mating flat portions on the stub 3 for drivingly connecting the retainer with the stub shaft 3. The bottom portion 27 of retainer 23 has a dimple or hump 33 adjacent the cylindrical wall portion 35 of the retainer against which one end of a driving coil spring 37 abuts. The other end of coil spring 37 abuts a dimple or hump 39 in a radially extending angular ledge or flange portion of a carbon retainer 43. Retainer 43 further includes an annular axially extending portion 45 at the end opposite ledge 41 of which is an inwardly and radially extending ledge or retaining portion 47.

Ledge 47 engages a resilient hose member 49 which is annular in shape and engages the stub shaft 3. The outer face of bellows 49 engages an annular carbon ring 51 having an opening 53 therein through which the shaft 3 passes and having a bearing face 55 which engages the face 57 of a stationary member 59. Member 59 has an 0-ring 61 in an angular recess 63 formed therein. The 0-ring 61 frictionally engages the end wall 5 and inhibits rotation of the stationary member 59.

End member 59 includes an angular groove 65 and a lip 67 located on the compressor side of the groove. The diameter of the lip 67 is greater than the internal diameter of an interned radially extending lip 69 on retainer 23. The lip 69 is formed during the assembly of the seal after the components are placed in association with one another as illustrated in FIG. 1. Thus, a unitized shield is achieved. This seal includes the retainer 23, the spring 37, the retainer 54, the bellows 49, the carbon ring 51 and the stationary member 59, including 0-ring 69. The stub shaft 3 has a central passage plan (not shown) through which lubricating oil passes to a generally radially extending passage 71. Thus, oil can be supplied to the seal 21 from the compressor sump.

During operation of the compressor, oil from the crank shaft oil hole 71 is thrown radially against the bottom portion 27 of the retainer 23 and against the sides 35 of such retainer. The lip 69 of the retainer 23 provides a dam and retains an angular ring or film of oil in contact with the spring 37 and the ledge 41 of the retainer 43, as well as the other peripheral edge of the lip 67 of the stationary member 59. The contact of the lip 67, with the oil provides a direct path through the stationary member for the removal of heat from the seal faces 55 and 57. Since the oil also directly contacts the spring in the retainer 43, the heat may be readily removed therefrom. The oil spills over the inward edge of lip 69.

The retainer 23 is positively driven by the flats 29 and 31 in contact with the stub shaft 3 and drives the spring 37 which in turn drivingly engages the retainer 43. A mating projection and dimple 44 drivingly connect the carbon 51 and retainer 43. As the oil flows over the inner edge of the lip 69 centrifugal force causes the latter to flow outwardly around the retainer 23 and back toward the bearing 11. It flows through the bearing 11 back to the oil sump of the compressor.

The second embodiment of this invention is illustrated in FIG. 2. It is similar in many respects to the embodiment shown in FIG. 1. However, the retainer 43' has a slightly longer axial portion 45' than the retainer 43. In addition, the stationary member is identified as at 59 and extends axially toward the compressor sump radially and inwardly of the axially portion 45' to a point which is closer to such sump and the lip 41'. The lip 69' is located closer to the end wall 5' than the lip 69 in the FIG. 1 embodiment. The operation of the FIG. 2 embodiment is substantially identical to the operation of the FIG. 1 embodiment and oil is allowed to flow from a centrally located oil hole 71' to and through the seal before passing outwardly of the seal back to the sump to the bearings 7'.

In the FIG. 3 embodiment a bellows 49 is shown to include an annular metallic ring 73 on which is seated the ledge 75 of a retainer 77. Retainer 77 has a radially extending central portion 79 at the outer edge of which is an axially extending cylindrical portion 81. Cylindrical portion 81 is drivingly connected to the carbon member 51 so as to be driven by the latter. The retainer 23" and stationary member 59" are generally similar to the retainer and stationary member shown in FIGS. 1 and 2 and perform the same function.

The FIG. 4 embodiment is generally similar to the FIG. 1 embodiment, but the stationary member 59''' is different in that the O-ring 61''' is adapted to engage the cylindrical wall of opening 19''' and a snap ring 79 is provided to prevent the inadvertent removal of the seal assembly. The FIG. 4 embodiment operates in the same manner as the embodiment shown in FIGS. 1–3, i.e., oil is adapted to flow from a radially extending hole in the shaft outwardly to the oil seal and through the oil seal back to the bearing 7.

It will be noted that in all the embodiments the oil is adapted to be in direct contact with the carbon retainer and the stationary member, thus providing for the removal of heat from these two relatively rotatable members. This direct contact is adapted to reduce the seal temperature during operation of the compressor and also facilitates the removal of contaminants from the seal area. These contaminants are permitted to flow with the oil back to the sump.

In view of the foregoing it will be seen that the several objects and advantages of this invention are achieved.

Although only one embodiment of the invention has been disclosed and described, it is apparent that other embodiments and modifications of the invention are possible.

We claim:

1. A gas seal for an automotive compressor having a housing end wall, a shaft extending through said end wall, and a bearing in said end wall rotatably supporting said shaft therein, said shaft having an oil passage therein adapted through which oil flows upon rotation of said shaft, said seal including a cup-shaped retainer arm annular stationary member frictionally engaging said end wall, an annular carbon member drivingly connected to said shaft, a carbon retainer drivingly connected to said carbon member, a spring extending between and drivingly connecting said carbon retainer and said cup-shaped retainer, said cup-shaped retainer, and said stationary member having overlapping lip means, the lip means on said cup-shaped retainer inhibiting the removal of said stationary member from the seal and for also causing oil flowing from said passage to flow in contact with said carbon retainer and said lip means on said stationary member to remove heat therefrom.

2. A gas seal set forth in claim 1 wherein said carbon retainer has a projection thereon, said cup-shaped retainer having a projection on its bottom, said spring engaging said projections to provide said driving connection between said retainers.

3. A gas seal as set forth in claim 1 further, including an annular resilient bellows, said carbon retainer having an axial portion and a radially extending portion at one end of said axial portion, said radial portion clamping said bellows to said carbon member under the influence of said spring.

4. A gas seal as set forth in claim 3 including a second radially extending portion at the other end of said axial portion, said second portion extending radially outward from said axial portion, said spring extending between said second radially extending portion and the bottom of said cup.

5. A gas seal as set forth in claim 3 further including a second axially extending portion extending axially from the end of said radially extending portion opposite the end at which said radial portion is connected to said first mentioned axial portion, said bellow having an annular ring member therearound, and said second axially extending portion engaging said annular ring member.

6. A gas seal as set forth in claim 2 further, including an annular resilient bellows, said carbon retainer having an axial portion and a radially extending portion at one end of said axial portion, said radial portion clamping said bellows to said carbon member under the influence of said spring.

7. A gas seal as set forth in claim 6 including a second radially extending portion at the other end of said axial portion, said second portion extending radially outward from said axial portion, said spring extending between said second radially extending portion and the bottom of said cup.

8. A gas seal as set forth in claim 6 further including a second axially extending portion extending axially from the end of said radially extending portion opposite the end at which such radial portion is connected to said first mentioned axial portion, said bellow having an annular ring member therearound, and said second axially extending portion engaging said annular ring member.

9. A gas seal as set forth in claim 1 wherein said stationary member includes an O-ring frictionally engaging said end wall.

10. A gas seal as set forth in claim 9 further, including annular resilient bellows, said carbon retainer having an axial portion and a radially extending portion at one end of said axial portion, said radial portion clamping said bellows to said carbon member under the influence of said spring.

* * * * *